(12) United States Patent
Wiseman

(10) Patent No.: US 6,530,482 B1
(45) Date of Patent: Mar. 11, 2003

(54) TANDEM SHALE SHAKER

(76) Inventor: Michael D. Wiseman, 5323 Graystone La., Houston, TX (US) 77069

(*) Notice: Subject to any disclaimer, the term of this patent is extended or adjusted under 35 U.S.C. 154(b) by 0 days.

(21) Appl. No.: 09/559,225

(22) Filed: Apr. 26, 2000

(51) Int. Cl.$^7$ .................................................. B07B 1/04
(52) U.S. Cl. ....................... 209/253; 209/273; 209/315; 209/316; 209/355
(58) Field of Search ................................. 209/253, 273, 209/315, 316, 355

(56) References Cited

U.S. PATENT DOCUMENTS

| | | | |
|---|---|---|---|
| 3,988,243 A | 10/1976 | Huff | 210/297 |
| 4,940,535 A | 7/1990 | Fisher et al. | 209/250 |
| 5,392,925 A | 2/1995 | Seyffert | 209/405 |
| 5,593,582 A * | 1/1997 | Roff, Jr. | 210/325 |
| 5,641,070 A | 6/1997 | Seyffert | 209/314 |
| 5,853,583 A * | 12/1998 | Shah | 210/340 |
| 5,967,336 A | 10/1999 | Baltzer et al. | 209/403 |
| 5,971,159 A | 10/1999 | Leone et al. | 209/399 |

* cited by examiner

*Primary Examiner*—Donald P. Walsh
*Assistant Examiner*—Jonathan R Miller
(74) *Attorney, Agent, or Firm*—Andy Arismendi, Jr.

(57) ABSTRACT

A tandem shale shaker having at least a base, at least one upper shaker screen, at least one lower shaker screen, a basket, an apparatus for vibrating the basket, at least one distribution conduit, a flowback pan, a flow director, and a distribution apparatus. The upper and lower shaker screens are releasably mounted on the basket. The at least one lower shaker screen is mounted at a level below the level of the at least one upper shaker screen and underlies the at least one upper shaker screen. The flowback pan is disposed between the at least one upper shaker screen and the at least one lower shaker screen and overlies at least a portion of the at least one lower shaker screen. The flowback pan directs the screened material passing through the at least one upper shaker screen to the at least one distribution conduit. The flow director selectively directs screened material flowing through the at least one distribution conduit (a) to the at least one lower shaker screen or (b) away from the at least one lower shaker screen. To operate the tandem shale shaker in parallel rather than in series, the distribution apparatus is set to selectively directs unscreened material to the at least one lower shaker screen. Further, the flow director directs the screened material from the at least one upper shaker screen away from the at least one lower shaker screen.

6 Claims, 8 Drawing Sheets

TANDEM SHALE SHAKER

BACKGROUND OF THE INVENTION

1. Field of the Invention

The present invention is directed to shale shakers with vibrating screens, and, in one aspect, to shale shakers with tiered or tandem screens.

2. Description of Related Art

The prior art discloses a wide variety of vibrating screens, devices which use them, shale shakers, and screens for shale shakers. In shale shakers which use a plurality of screens, problems arise when an initial screen encounters such a large amount of fluid, e.g. drilling mud, that adequate and efficient screening is not possible.

The need for solids control in drilling mud in hydrocarbon well drilling is well known in the prior art. Drilling mud, typically a mixture of clay, water and various additives, is pumped through a hollow drill string (pipe, drill collar, bit, etc.) down into a well and exits through holes in a drill bit. The mud picks up cuttings (rock bits) and other solids from the well and carries them upwardly away from the bit and out of the well in a space between the well walls and the drill string. At the top of the well, the solids-laden mud is introduced to a shale shaker, a device which typically has a series of screens arranged in tiered or flat disposition with respect to each other. The screens catch and remove solids from the mud as the mud passes through them. If drilled solids are not removed from the mud used during the drilling operation, recirculation of the drilled solids can create viscosity and gel problems in the mud, as well as increasing wear in mud pumps and other mechanical equipment used for drilling. In some shale shakers, a fine screen cloth is used with the vibrating screen. The screen may have two or more overlying layers of screen cloth. The frame of the vibrating screen is suspended or mounted upon a support and is caused to vibrate by a vibrating mechanism, e.g. an unbalanced weight on a rotating shaft connected to the frame. Each screen may be vibrated by vibratory equipment to create a flow of trapped solids toward an end of the screen on a top surface of the screen for removal and disposal of solids. The fineness or coarseness of the mesh of a screen may vary depending upon mud flow rate and the size of the solids to be removed.

In certain prior art shale shakers having one (or more) processing screens, such screens cannot adequately deal with a surge in fluid flow or high fluid flow rates, e.g. During a "bottoms up" or riser pipe circulation condition. La other prior art systems, the discharge of one or more shale shakers is fed to another shale shaker for further de-liquefying and de-oiling. Such a process necessarily requires at least two shale shakers. However, on offshore drilling rigs, space is at a premium. For this reason, tiered or tandem shale shakers are used to effect a finer screening of the mud on the second level. But, in high volume operations, such tandem shale shakers may not be able to handle the throughput due to their limited size.

Accordingly, there is a need to enhance the capacity of a tandem shale shaker during high mud volume operations without increasing their "foot print", i.e., the area of floor space required by the base of the tandem shale shaker.

SUMMARY OF THE INVENTION

Accordingly, the present invention provides a shale shaker having at least a base, at least one upper shaker screen, at least one lower shaker screen, a basket, at least one distribution conduit, a flowback pan, a flow director, and a distribution apparatus. The basket is mounted movably with respect to and on the base. The at least one upper and lower shaker screens are releasably mounted on the basket. The at least one lower shaker screen is mounted at a level below the level of the at least one upper shaker screen and underlies the at least one upper shaker screen. The flowback pan is disposed between the at least one upper shaker screen and the at least one lower shaker screen and overlies at least a portion of the at least one lower shaker screen. This prevents at least a portion of the screened material falling through the at least one upper shaker screen from contacting the at least one lower shaker screen. The flowback pan directs such screened material to the at least one distribution conduit. The flow director selectively directs screened material flowing through the at least one distribution conduit (a) to the at least one lower shaker screen or (b) away from the at least one lower shaker screen. To operate the tandem shale shaker in parallel rather than in series, the distribution apparatus is set to selectively direct unscreened material to the at least one lower shaker screen and the flow director is positioned to direct the screened material from the at least one upper shaker screen away from the at least one lower shaker screen, for example, to a sump. The shale shaker preferably has an apparatus for vibrating the basket. The apparatus for vibrating the basket is interconnected with the basket.

BRIEF DESCRIPTION OF THE DRAWINGS

A more particular description of the embodiments of the invention briefly summarized above may be had by reference to the embodiments which are shown in the drawings which form a part of this specification. These drawings illustrate certain preferred embodiments that are not to be used to improperly delimit the scope of the invention, which may have other equally effective or equivalent embodiments.

DETAILED DESCRIPTION OF THE INVENTION

Figure 1:
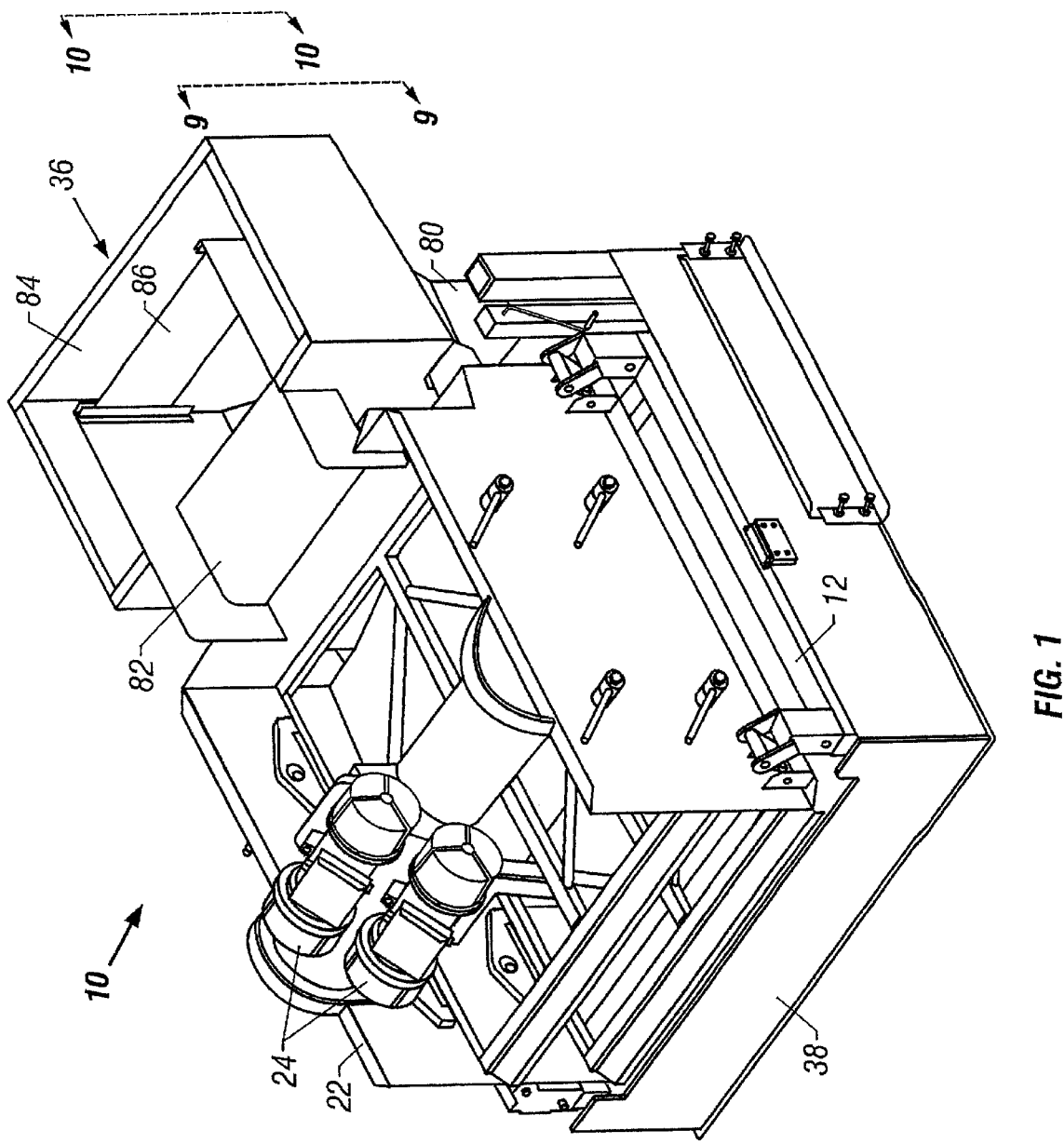
FIG. 1 is a perspective corner and slightly elevated view of a shaker according to the present invention.
Figure 2:
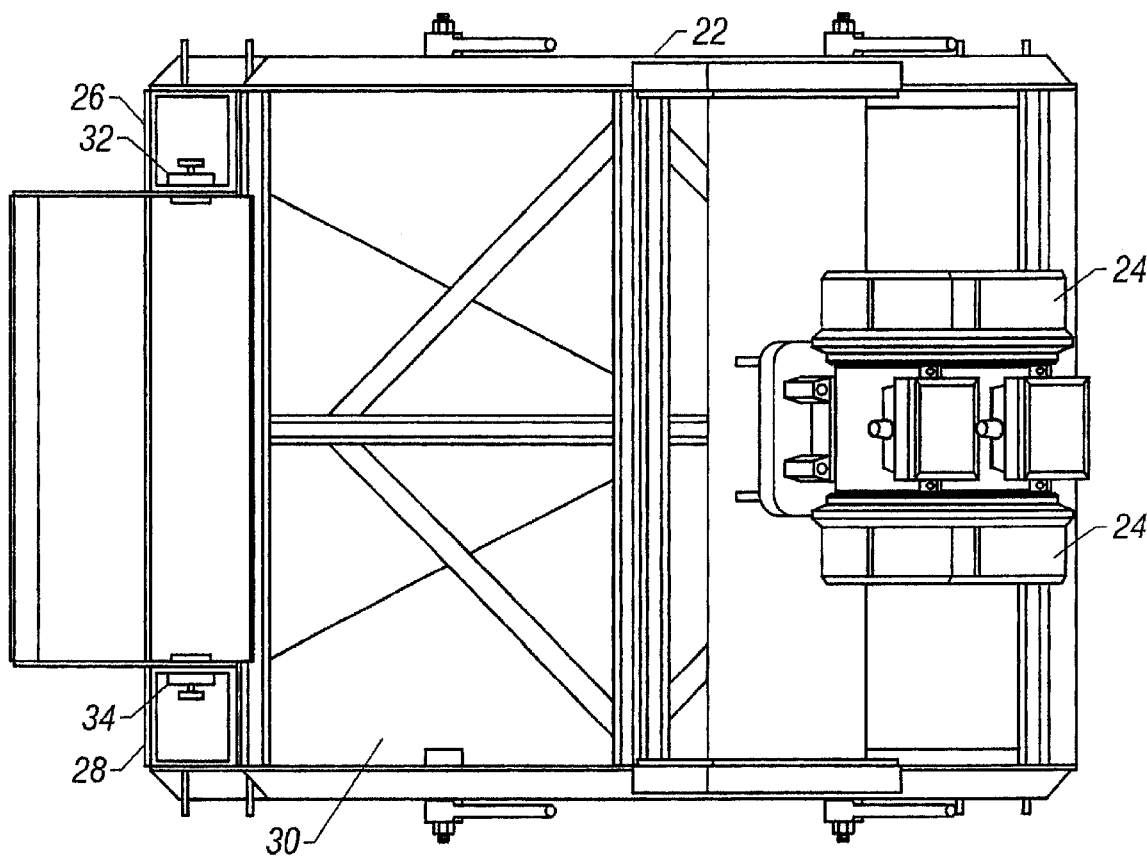
FIG. 2 is a top view of the basket with vibration motors.
Figure 3:
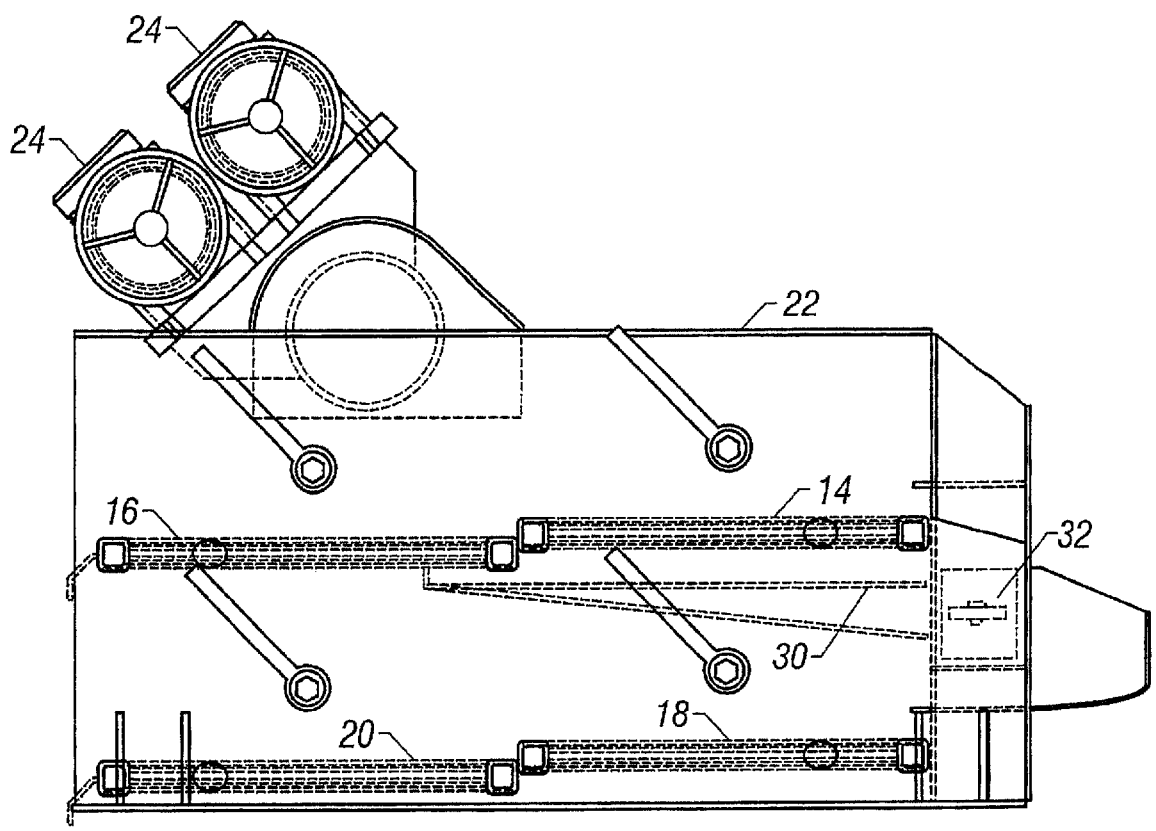
FIG. 3 is a side view of the basket shown in FIG. 2, with dashed lines signifying internal components.

Referring to FIGS. 1–3, a shale shaker 10 having a base 12 (see FIG. 1), upper shaker screen 14 and 16 (see FIG. 3), lower shaker screens 18 and 20 (see FIG. 3), a basket 22, an apparatus 24 for vibrating the basket 22, distribution conduits 26 and 28, a flowback pan 30, flow directors 32 and 34 (see FIG. 2), and a distribution apparatus 36. The basket 22 is mounted movably with respect to and on the base 12. The apparatus 24 for vibrating the basket 22 is interconnected with the basket 22.

The upper and lower shaker screens 14, 16, 18 and 20 are releasably mounted on the basket 22 by any method known in the prior art or as disclosed in co-pending application filed concurrently herewith entitled "Shale Shaker Screen Retainer" (U.S. application Ser. No. 09/559,226), which is hereby incorporated by reference. The lower screen 18 is mounted at a level below the level of the upper screen 14 and underlies it.

The flowback pan 30 is disposed between the upper screen 14 and the lower screen 18 and overlies a portion of lower screen 20. This prevents at least a portion of the screened material falling through upper screens 14 and 16 from contacting the lower screens 18 and 20. The flowback pan 30 directs such screened material to the distribution conduits 26 and 28. The flow directors 32 and 34 selectively direct screened material flowing through the distribution conduits 26 and 28 (a) to the lower screen 18 or (b) away from the lower screen 18 to the sump 38. The flow directors 32 and 34 are positioned in FIG. 2 to direct the screened material away from the lower screen 18 to the sump 38. The sump 38 located below the basket 22 receives all the screened material falling through the lower shaker screens 18 and 20 and the screened material directed away from the lower shaker screen 18 by the flow directors 32 and 34.

In order to operate the tandem shale shaker in parallel rather than in series, the distribution apparatus 36 is set to selectively direct unscreened material to the lower screen 18. Further, the flow directors 32 and 34 are positioned to direct the screened material from the upper screen 14 and 16 away from the lower screen 18 and toward to the sump 38.

Figure 4:
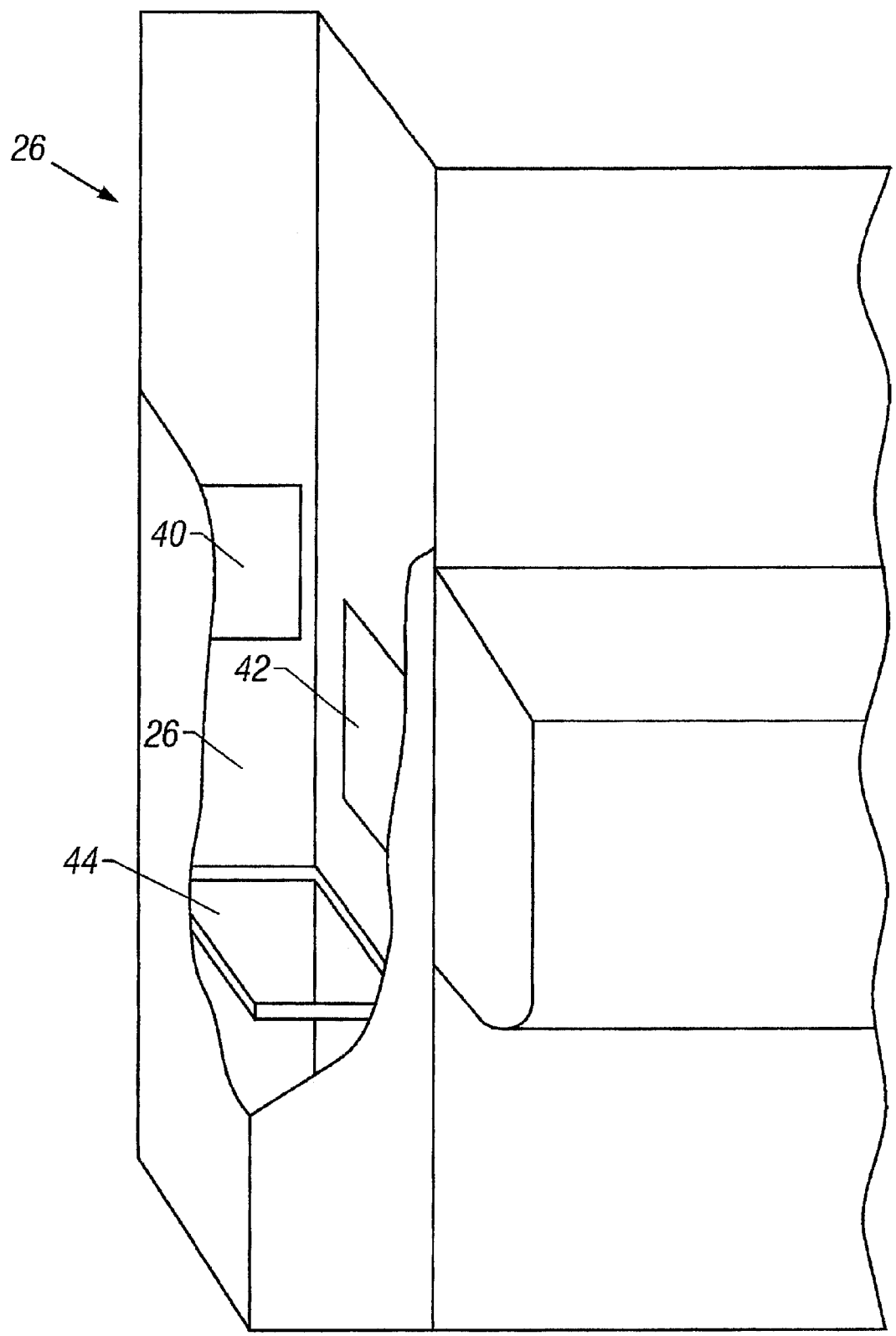
FIG. 4 is a partial cross-section of a distribution conduit for the shale shaker shown in FIG. 2.

Referring now to FIG. 4, there is shown distribution conduit 26 in a partial cut away view. The screened material received from the flowback pan 30 enters the distribution conduit 26 through opening 40. Opening 42 allows access from the distribution conduit 26 to the lower screen 18. Opening 44 allows access to the sump 38. By selectively sealing opening 44, a first flow path is established to the lower shaker screen 18 from opening 40 via the distribution conduit 26. By selectively sealing opening 42, a second flow path from opening 40 to opening 44 via the distribution conduit 26 is established directing screen materials received from the flowback pan 30 away from the lower shaker screen 18 and to the sump 38. Distribution conduit 28 is similar to distribution conduit 26 and also has openings 40, 42 and 44, which perform the same function.

Figure 7:
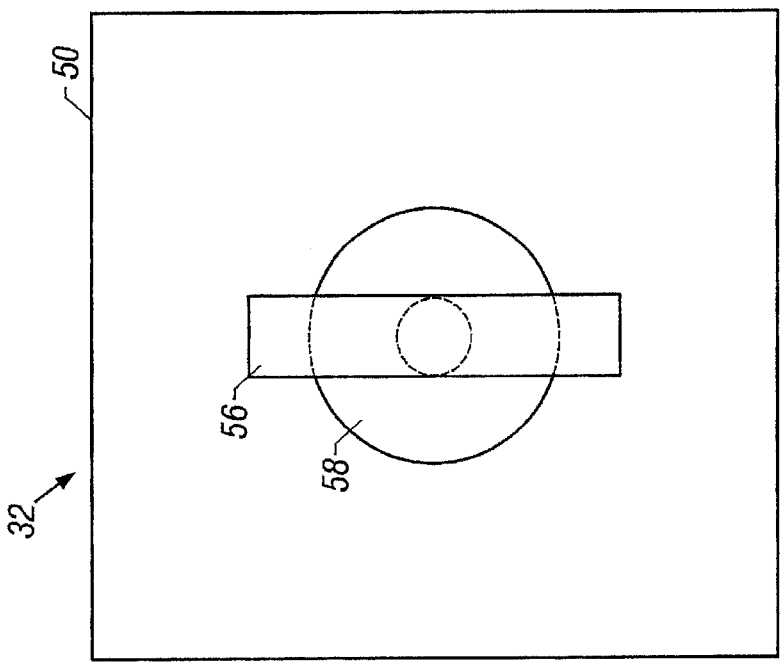
FIG. 7 is a top view of the sealing body and handle of the flow director shown in FIG. 6.
Figure 6:
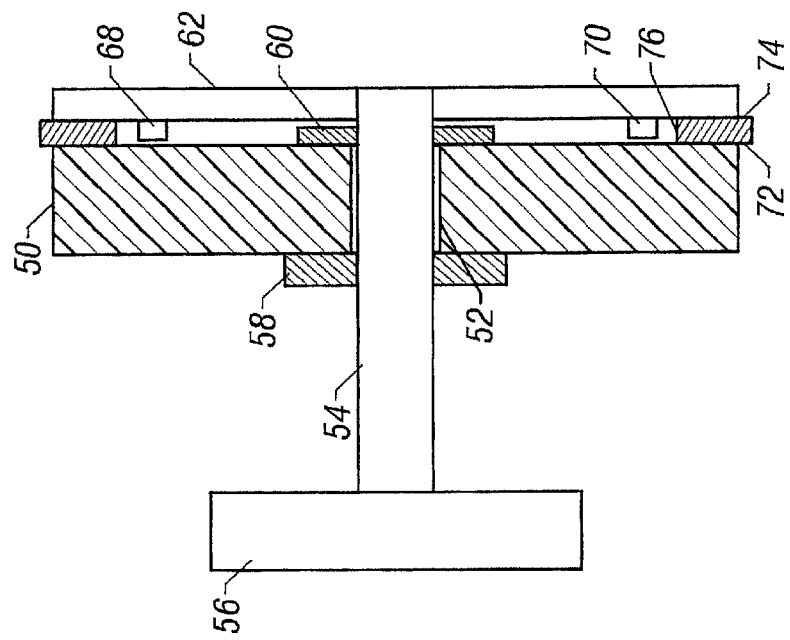
FIG. 6 is a side view of a flow director according to the present invention.
Figure 5:
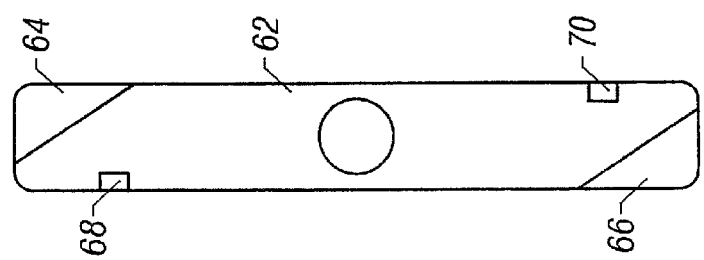
FIG. 5 is a top view of a retainer plate for a flow director according to the present invention.
Figure 8:
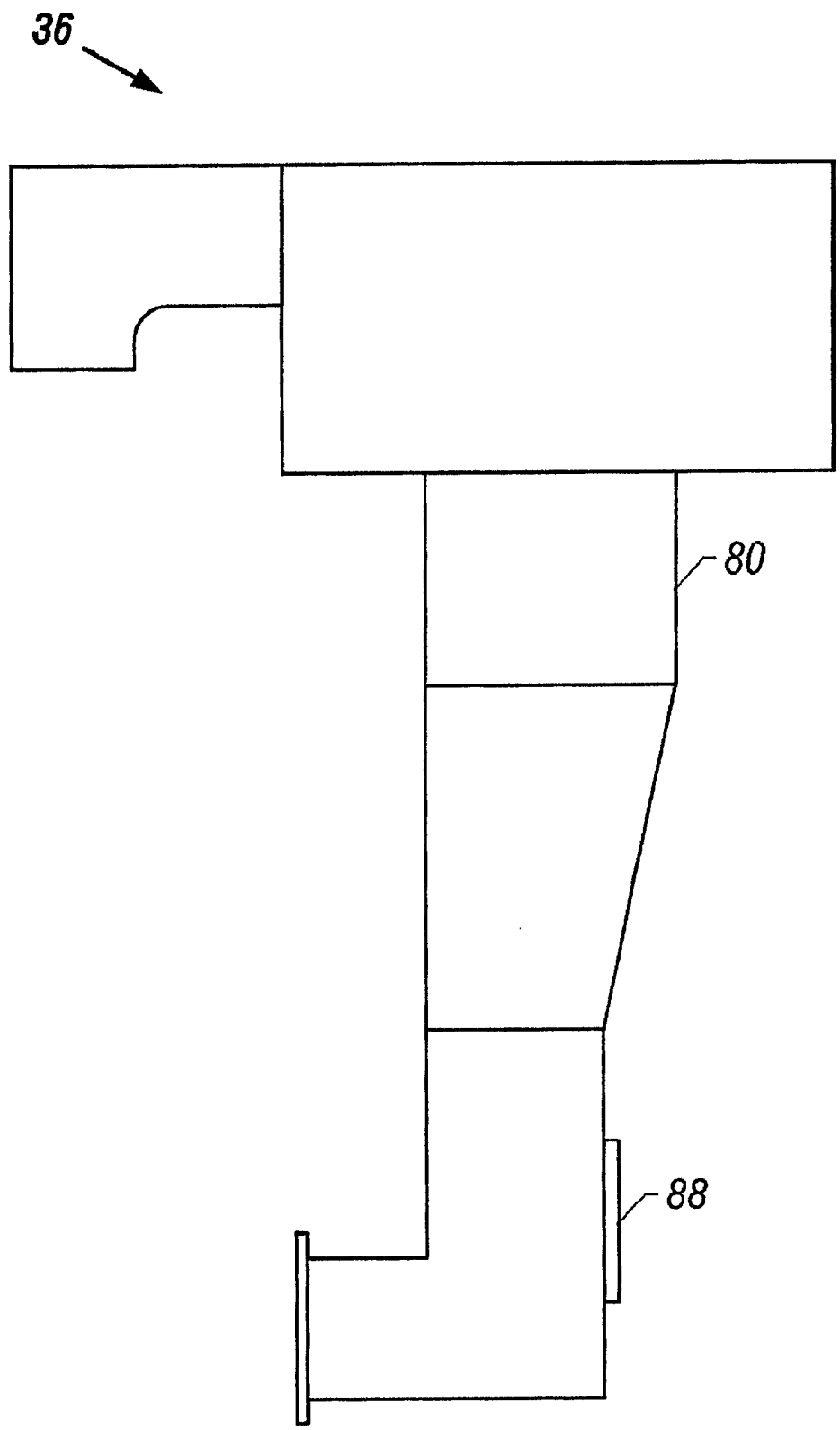
FIG. 8 is a side view of a distribution assembly according to the present invention.

Flow directors are used to selectively seal openings 42 or 44. Any suitable means for selectively sealing and unsealing an opening may be used. Examples include valves or sliding or hinged plates which may be used to cover or uncover the respective opening. In this embodiment, the flow directors 32 and 34 are each a removable plug for selectively plugging opening 42 or 44. Flow directors 32 and 34 are similar. Referring now to FIGS. 5, 6 and 7, flow director 32 has a sealing body 50 with a centrally located hole 52 therethrough. A shaft 54 extends through the hole 52. On one end of the shaft 54, there is a handle 56. The sealing body 50 is maintained at a location intermediate of the two ends of the shaft 50 by a pair of washers 58 and 60 attached to the shaft 54. On the other end of the shaft 50 opposite the handle 56 is attached a plate 62 having upturned edges 64 and 66 and stops 68 and 70. The sealing body 50 is preferably made of an elastomeric thermoplastic or thermosetting polymer, including copolymers and polymer blends.

In use, referring specifically to FIG. 6, the flow director 32 is placed over an opening 42 or 44 with the sealing body 50 in contact with the surface 72 having the desired opening 42 or 44. Once in proper position, the plate 62 extends through the desired opening 42 or 44 and the handle 56 is turned, which causes the plate 62 to rotate. As the plate 62 rotates, the upturned edges 64 and 66 make contact with the opposite surface 74 and then cause the ends of the plate 62 to go over surface 74 and exert a sealing pressure to the surface of the sealing body 50 contacting surface 72, thereby sealing the desired opening 42 or 44. Stops 68 and 70 prevent over rotation of the handle 56 once the stops 68 and 70 make contact with the perimeter surface 76, which defines the desired opening 42 or 44.

Figure 9:
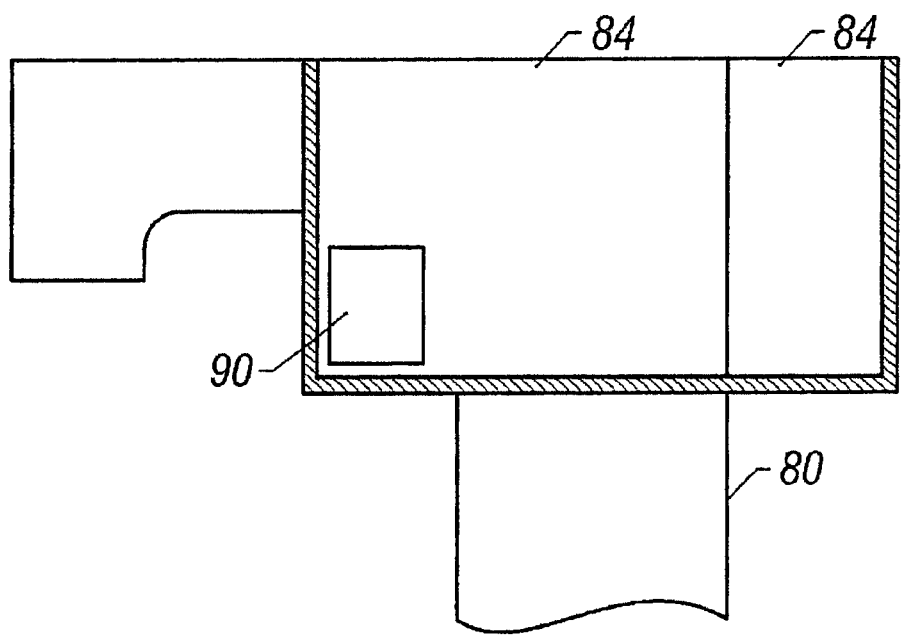
FIG. 9 is a cross-section of the distribution assembly shown in FIG. 1 along line 9—9.
Figure 10:
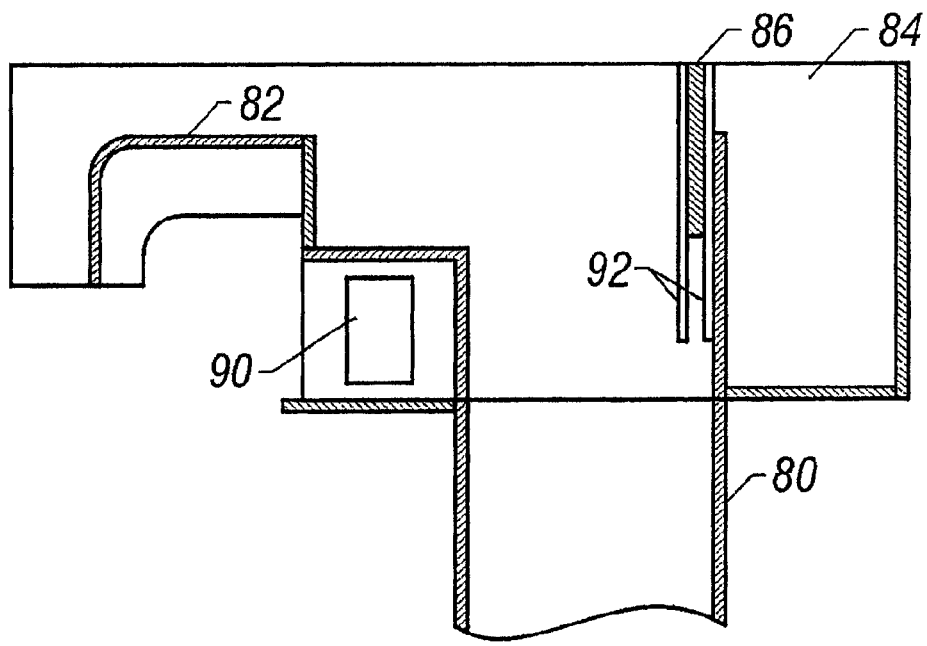
FIG. 10 is a cross-section of the distribution assembly shown in FIG. 1 along line 10—10.

Referring to FIGS. 1, 8, 9 and 10, the distribution apparatus 36 has a riser box 80, a first weir 82, a reservoir chamber 84 and a vertically sliding plate weir 86. The riser box 80 has a source of unscreened material attached to it at plate 88 when installed. The first weir 82 is used for feeding unscreened material to upper shaker screens 14 and 16 once the riser box 80 fills with the unscreened material above the height of the first weir 82. The reservoir chamber 84 is in communication with a pair of inlets 90 to the lower shaker screens 18 and 20. The vertically sliding plate weir 86 is used for optionally allowing unscreened material from the riser box 80 to enter the reservoir chamber 84 when the vertically sliding plate weir 86 is in a lowered position. The reservoir chamber 84 then directs the unscreened material therein to the lower shaker screens 18 and 20 via inlets 90 (one on each side of the riser box 80 as shown in FIGS. 9 and 10). The vertically sliding plate weir 86 slides vertically up and down between two pairs of tracks 92, one on each side of the upper portion of the riser box 80 (only one pair shown). The vertically sliding plate weir 86 may be held in position, lowered or raised by any suitable means, such as using a sliding plate valve controlled by a screw crank or by using a hydraulically powered actuator attached to the weir 86.

Figure 11:
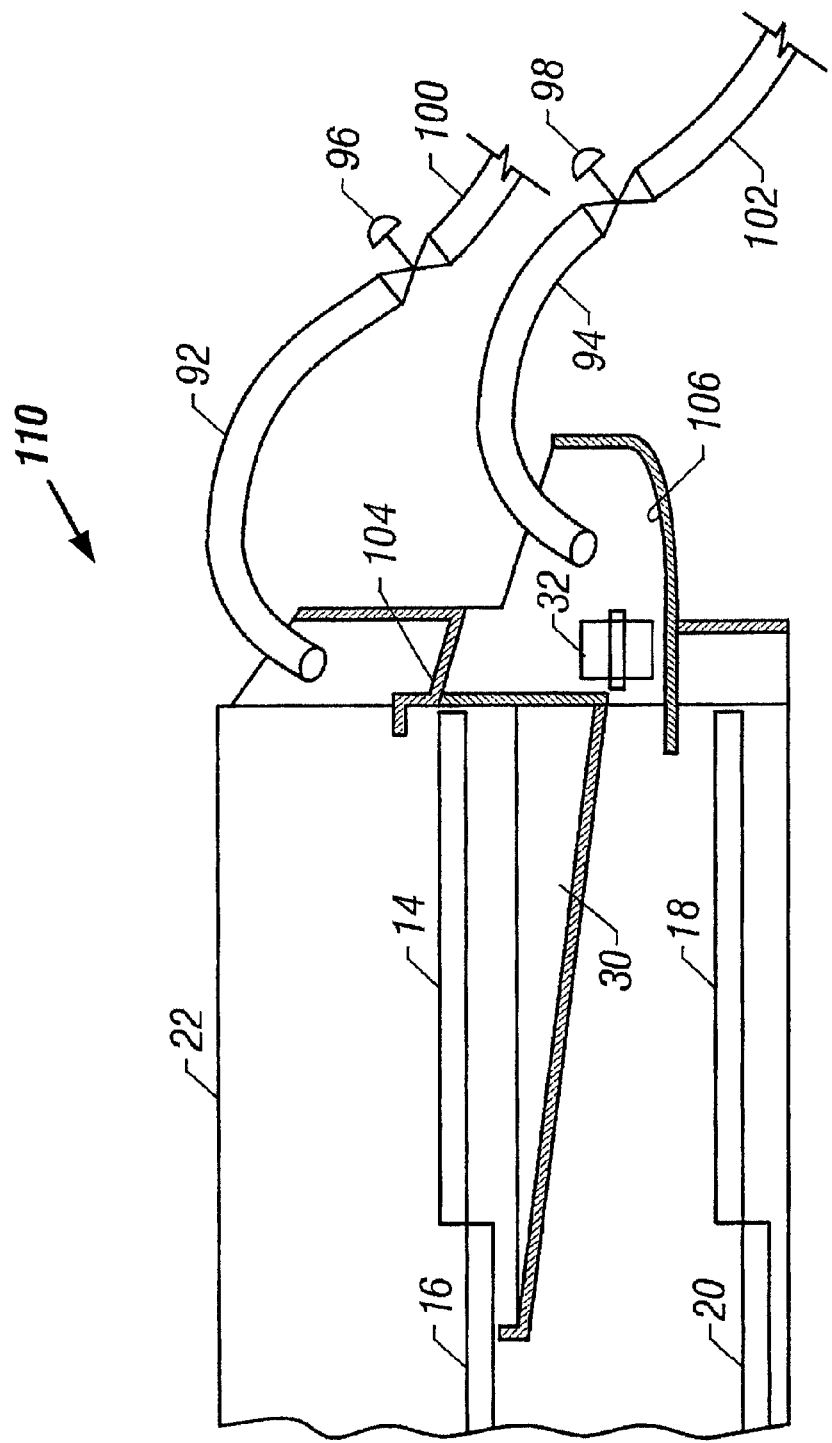
FIG. 11 is a partial side view in partial cross-section of a distribution assembly according to the present invention.

Referring now to FIG. 11, basket 22 is shown in combination with another embodiment of the distribution apparatus comprises a header system 110 with a first outlet 92, a second outlet 94, a first valve 96 and second valve 98. The first outlet 92 feeds the upper shaker screens 14 and 16 via trough 104. The second outlet 94 feeds the lower shaker screens 18 and 20 via trough 106. In this configuration, flow directors 32 (shown) and 34 (not shown) close openings 42 directing the screened material received from the flowback pan 30 to the sump 38 (not shown). The first valve 96 is connected to the first outlet 92 for controlling the feed rate of the unscreened material received via pipe 100 to the upper shaker screens 14 and 16. The second valve 98 is connected to the second outlet 94 for controlling the feed rate of the unscreened material received via pipe 102 to the lower shaker screens 18 and 20. It is noted that the first and second valves may be replaced by other flow regulating devices known in the art, for example, using flat or V-notched weirs which are raised or lowered to reduce or increase the flow rate, respectively, of unscreened material exiting a holding tank and fed to the shaker of the present invention.

What is claimed is:

1. A shale shaker comprising:
   a base;
   at least one upper shaker screen;

at least one lower shaker screen;

a basket mounted movably with respect to and on the base;

wherein the at least one upper and lower shaker screens are releasably mounted on the basket and the at least one lower screen is mounted at a level below a level of the at least one upper shaker screen and underlying the at least one upper shaker screen;

at least one distribution conduit;

a flowback pan disposed between the at least one upper shaker screen and the at least one lower shaker screen, the flowback pan overlying at least a portion of the at least one lower shaker screen for preventing at least a portion of the screened material falling through the at least one upper shaker screen from contacting the at least one lower shaker screen and for directing said screened material to the at least one distribution conduit;

a flow director for selectively directing screened material flowing through the at least one distribution conduit (a) to the at least one lower shaker screen or (b) away from the at least one lower shaker screen; and a distribution apparatus for selectively directing unscreened material to the at least one lower shaker screen.

2. The shale shaker of claim 1, further comprising a sump below the basket for receiving all the screened material falling through the at least one lower shaker screen and for receiving the screened material directed away from the at least one lower shaker screen by the flow director.

3. The shale shaker of claim 1, wherein the at least one distribution conduit has a first flow path to the at least one lower shaker screen and a second flow path away from the at least one lower shaker screen, and the flow director is a removable plug for selectively plugging the first or second flow path.

4. The shale shaker of claim 1, wherein the distribution apparatus comprises a header system with a first outlet, a second outlet, a first flow regulating device and a second flow regulating device, with the first outlet feeding the at least one upper shaker screen, the second outlet feeding the at least one lower shaker screen, the first flow regulating device in communication with the first outlet for controlling the feed rate of the unscreened material to the at least one upper shaker screen, and the second flow regulating device in communication with the second outlet for controlling the feed rate of the unscreened material to the at least one lower shaker screen.

5. The shale shaker of claim 1, wherein the distribution apparatus comprises a riser box to which a source of unscreened material is attached when installed;

a first weir for feeding unscreened material to the at least one upper shaker screen once the riser box fills with the unscreened material above the height of the first weir;

a reservoir chamber in communication with an inlet to the at least one lower shaker screen; and a vertically sliding plate weir used for optionally allowing unscreened material from the riser box to enter the reservoir chamber when the vertically sliding plate weir is in a lowered position allowing unscreened materials to enter the reservoir chamber from the riser box and the reservoir chamber then directing the unscreened material therein to the at least one lower shaker screen.

6. The shale shaker of claim 1, further comprising an apparatus for vibrating the basket, said apparatus interconnected with the basket.

* * * * *